United States Patent
Uchimura

(10) Patent No.: US 8,627,745 B2
(45) Date of Patent: Jan. 14, 2014

(54) MOTOR WITH SPEED REDUCTION MECHANISM

(75) Inventor: Hiroyuki Uchimura, Kiryu (JP)

(73) Assignee: Mitsuba Corporation, Kiryu-shi, Gunma (JP)

( * ) Notice: Subject to any disclaimer, the term of this patent is extended or adjusted under 35 U.S.C. 154(b) by 307 days.

(21) Appl. No.: 13/058,991

(22) PCT Filed: Aug. 13, 2009

(86) PCT No.: PCT/JP2009/064314
§ 371 (c)(1),
(2), (4) Date: Feb. 14, 2011

(87) PCT Pub. No.: WO2010/021294
PCT Pub. Date: Feb. 25, 2010

(65) Prior Publication Data
US 2011/0133584 A1 Jun. 9, 2011

(30) Foreign Application Priority Data

Aug. 18, 2008 (JP) ................................ 2008-210023

(51) Int. Cl.
| | | |
|---|---|---|
| F16H 57/02 | (2012.01) | |
| F16H 57/04 | (2010.01) | |
| F16H 61/00 | (2006.01) | |
| F16H 1/16 | (2006.01) | |
| F16H 1/20 | (2006.01) | |
| F16H 27/02 | (2006.01) | |
| F16H 29/20 | (2006.01) | |
| F16H 29/02 | (2006.01) | |

(52) U.S. Cl.
USPC ........................... 74/606 R; 74/425; 74/89.14

(58) Field of Classification Search
USPC ........ 74/89.14, 411, 425, 606 R; 296/216.01, 296/100.1; 310/83, 89, 43, 154.15; 403/11–13, 267, 321, 326, 331, 376, 403/381; 277/358, 375, 376, 384
See application file for complete search history.

(56) References Cited

U.S. PATENT DOCUMENTS 5,816,733 A * 10/1998 Ishikawa et al. .............. 403/329
6,022,113 A * 2/2000 Stolpe et al. .................. 359/841
(Continued)

FOREIGN PATENT DOCUMENTS

EP 1914843 A1 4/2008
JP 8162779 A 6/1996
(Continued)

OTHER PUBLICATIONS

Office Action and English Translation received in Japanese Patent Application Serial No. 2008-210023 dated Jul. 24, 2012.
(Continued)

*Primary Examiner* — David M Fenstermacher
*Assistant Examiner* — Jake Cook
(74) *Attorney, Agent, or Firm* — McCormick, Paulding & Huber LLP

(57) ABSTRACT

A worm wheel housing portion 19 of a gear case 16 has a bottomed cylindrical shape having a bottom wall portion 19a and a cylindrical wall portion 19b, and a bottom cover 35 is assembled at an opening portion of the worm wheel housing portion 19 so as to seal the opening portion. Among a plurality of latching structures for assembling them, as a latching structure other than those on a worm housing portion 17 side, a groove 44 is formed to a latching claw 38b extending along the cylindrical wall portion 19b from an outer circumferential portion of the bottom cover 35, and a projecting piece 47 engaged with the groove 44 is provided on an outer wall surface of the cylindrical wall portion 19. Wall portions 53 and 54 covering side surfaces a and tip face of the latching claw 38b are provided on the outer wall surface of the cylindrical wall portion 19b, so that breakage of the latching claw 38b or release of the engagement of the latching claw 38 to be caused, for example, when an object hits the latching claw 38b can be prevented.

10 Claims, 6 Drawing Sheets

(56) References Cited

U.S. PATENT DOCUMENTS

| | | | | |
|---|---|---|---|---|
| 6,543,902 | B2* | 4/2003 | Bohm | 359/841 |
| 6,742,413 | B2* | 6/2004 | Schwital et al. | 74/606 R |
| 6,977,458 | B2* | 12/2005 | Kraus et al. | 310/239 |
| 7,284,458 | B2* | 10/2007 | Magnusson et al. | 74/25 |
| 7,427,142 | B2* | 9/2008 | Onuki | 359/841 |
| 2002/0121151 | A1 | 9/2002 | Kraus et al. | |
| 2003/0008746 | A1 | 1/2003 | Meier et al. | |
| 2004/0221681 | A1* | 11/2004 | Saito et al. | 74/606 R |
| 2005/0040715 | A1* | 2/2005 | Nesic | 310/71 |
| 2006/0001989 | A1* | 1/2006 | Onuki | 359/864 |
| 2006/0163958 | A1* | 7/2006 | Yagi et al. | 310/71 |

FOREIGN PATENT DOCUMENTS

| | | |
|---|---|---|
| JP | 11261254 A | 9/1999 |
| JP | 2001294044 A | 10/2001 |
| JP | 2003047204 A | 2/2003 |
| JP | 2008099392 A | 4/2008 |

OTHER PUBLICATIONS

The International Search Report from corresponding International Application No. PCT/JP2009/064314 dated Nov. 10, 2009.

Office Action and English Translation received in Chinese Patent Application Serial No. 200980132281.3 dated Dec. 21, 2012.

* cited by examiner

MOTOR WITH SPEED REDUCTION MECHANISM

CROSS REFERENCE TO RELATED APPLICATIONS

This application is entitled to the benefit of and incorporates by reference essential subject matter disclosed in International Patent Application No. PCT/JP2009/064314 filed on Aug. 13, 2009 and Japanese Patent Application No. 2008-210023 filed Aug. 18, 2008.

TECHNICAL FIELD

The present invention relates to a motor with speed reduction mechanism which decelerates rotation of a motor main body by a speed reduction mechanism to transmit the rotation to a member to be driven.

BACKGROUND ART

A motor with speed reduction mechanism in which a motor main body and a speed reduction mechanism are made into one unit is used as a drive source of a vehicle automatic opening/closing device of a power window device, a sunroof device, or the like provided on a vehicle. The motor with speed reduction mechanism decelerates the rotation of the motor main body by the speed reduction mechanism composed of a worm, which is formed on a rotation shaft of the motor main body, and a worm wheel meshing with the worm, the output of motor with speed reduction mechanism is transmitted to an open/close element such as a window glass serving as a member to be driven, so that a large output can be obtained even though the motor with speed reduction mechanism is small.

The motor with speed reduction mechanism includes a gear case in which a worm housing section housing the worm of the rotation shaft and a worm wheel housing portion housing the worm wheel are integrally formed so that the worm and the worm wheel mesh with each other inside the gear case. The worm wheel housing portion has a bottomed cylindrical shape, and the worm wheel housing portion is sealed when a bottom cover is assembled at an opening portion of the worm wheel housing portion in the state in which an output gear rotated together with the worm wheel is projecting from the opening portion of the worm wheel housing portion.

When assembling the worm wheel housing portion and the bottom cover, the bottom cover is fixed to the worm wheel housing portion by press-fitting, bonding, welding, etc. in some cases; however, generally, they are assembled by a plurality of latching structures latched by claws so that reassembly of the worm wheel housing portion and the bottom cover is facilitated. For example, in a motor with speed reduction mechanism (drive device for sunroof) described in Japanese Patent Application Laid-Open Publication No. 2001-294044, a groove is formed in a latching claw extending along an outer wall surface of a worm wheel housing portion (gear housing) from an outer circumferential portion of a bottom cover (gear case), a projecting piece engaged with the groove is provided on the outer wall surface of the worm wheel housing portion, so that the worm wheel housing portion and the bottom cover are assembled by engagement of the groove and the projecting piece.

DISCLOSURE OF THE INVENTION

In the conventional latching structure, the worm wheel housing portion and the bottom cover are assembled by the groove, which is formed in the latching claw that is extended from the outer circumferential portion of the bottom cover and along the outer wall surface of the worm wheel housing portion, and the projecting piece, which is provided on the outer wall surface of the worm wheel housing portion; and, when the latching claw is pushed open toward the outside in the diametrical direction, the engagement of the groove and the projecting piece is released so that the worm wheel housing portion and the bottom cover can be easily detached upon, for example, maintenance.

However, in the motor with speed reduction mechanism described in Japanese Patent Application Laid-Open Publication No. 2001-294044, the latching claw is disposed on the outside in the diametrical direction than the outer wall surface of the worm wheel housing portion, and the side surfaces and the tip surface of the latching claw are exposed; therefore, breakage of the latching claw or release of the engagement of the latching claw may be posed, for example, when an object hits the latching claw after assembly of the worm wheel housing portion and the bottom cover.

SUMMARY OF THE INVENTION

A preferred aim of the present invention is to prevent breakage of the latching claw and detachment of the latching claw.

A motor with a speed reduction mechanism according to the present invention includes: a yoke rotatably supporting an armature shaft; a worm shaft integrally rotated with the armature shaft and provided with a worm; a gear case provided with a worm housing portion housing the worm shaft and provided with a worm wheel housing portion in a bottomed shape housing a worm wheel meshed with the worm of the worm shaft, the gear case having the yoke attached; and a bottom cover covering an opening portion of the worm wheel housing portion, the motor with a speed reduction mechanism comprising: a latching claw provided on an outer circumferential portion of the bottom cover and extending along an outer wall surface of the worm wheel housing portion; a projecting piece provided on either one of the latching claw or the outer wall surface of the worm wheel housing portion and projecting toward the other one of the latching claw or the outer wall surface of the worm wheel housing portion; a groove provided on the other one of the latching claw or the outer wall surface of the worm wheel housing portion and engaged with the projecting piece as the projecting piece is inserted in the groove; and a wall portion provided on the outer wall surface of the worm wheel housing portion and covering a side surface and a tip face of the latching claw.

A motor with a speed reduction mechanism according to the present invention includes: a yoke rotatably supporting a rotation shaft provided with a worm; a gear case provided with a worm housing portion housing the worm and provided with a worm wheel housing portion in a bottomed shape housing the worm wheel meshed with the worm, the gear case having the yoke attached; and a bottom cover covering an opening portion of the worm wheel housing portion, the motor with a speed reduction mechanism comprising: a latching claw provided on an outer circumferential portion of the bottom cover and extending along an outer wall surface of the worm wheel housing portion; a projecting piece provided on either one of the latching claw or the outer wall surface of the worm wheel housing portion and projecting toward the other one of the latching claw or the outer wall surface of the worm wheel housing portion; a groove provided on the other one of the latching claw or the outer wall surface of the worm wheel housing portion and engaged with the projecting piece as the projecting piece is inserted in the groove; and a wall portion provided on the outer wall surface of the worm wheel housing portion and covering a side surface and a tip face of the latching claw.

In the motor with a speed reduction mechanism according to the present invention, the wall portion covers an entire side surface of the latching claw.

In the motor with a speed reduction mechanism according to the present invention, the projecting piece and the groove are engaged with each other by an engaging surface formed in a diametrical direction of the worm wheel housing portion.

In the motor with a speed reduction mechanism according to the present invention, the wall portion is formed to project to an outside diameter side than the latching claw with respect to a diametrical direction of the worm wheel housing portion.

According to the present invention, the wall portion covering the side surfaces and the tip surface of the latching claw disposed in the diametrical-direction outside the outer wall surface of the worm wheel housing portion is provided on the outer wall surface of the worm wheel housing portion; therefore, breakage of the latching claw or release of the engagement of the latching claw caused, for example, when an object hits the latching claw after assembly of the worm wheel housing portion and the bottom cover can be prevented.

BEST MODE FOR CARRYING OUT THE INVENTION

Figure 1:
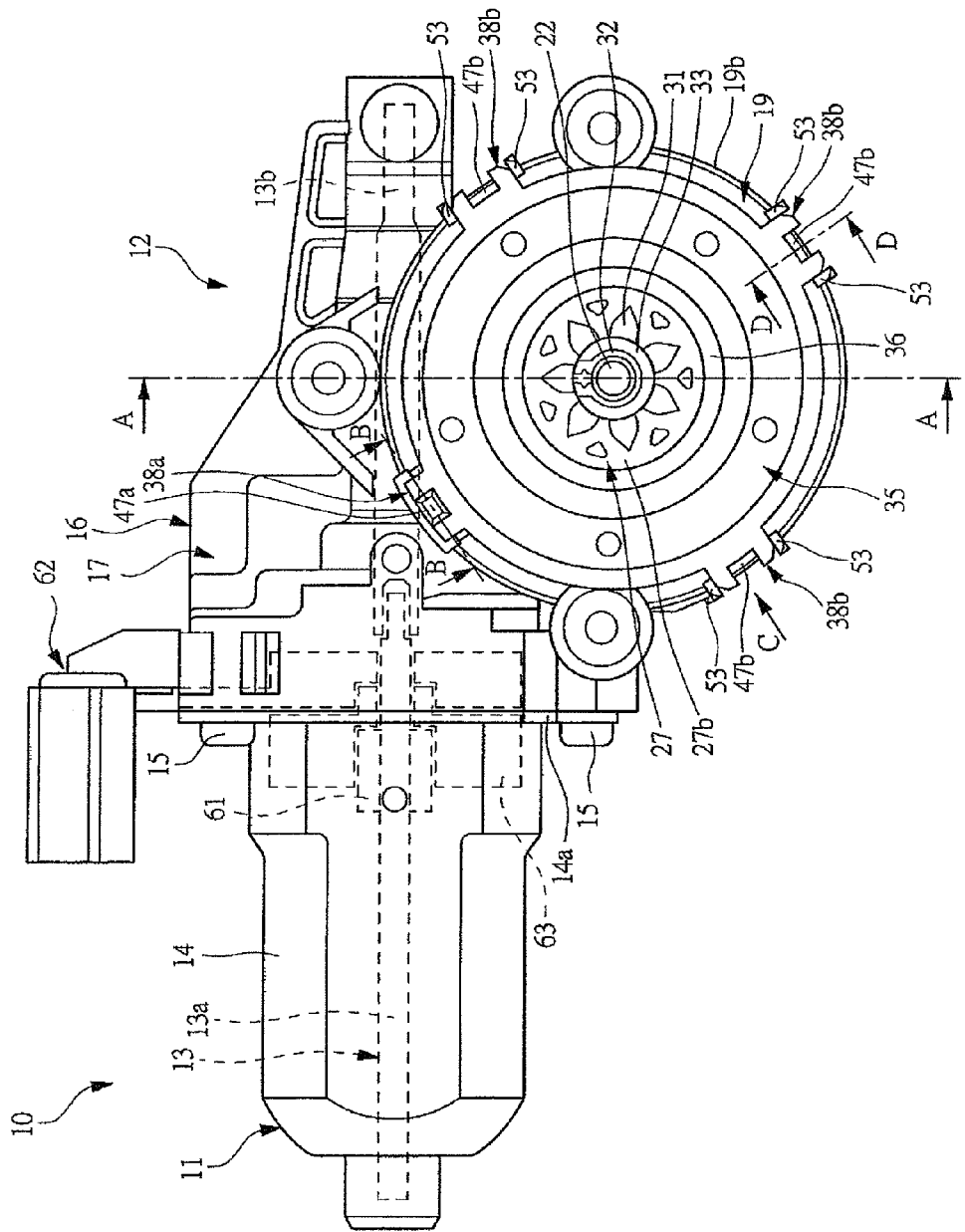
FIG. 1 is a plan view of a power window motor, which is a first embodiment of the present invention.

Hereinafter, an embodiment of the present invention will be described in detail based on the drawings. This power window motor 10 is provided in a power window device provided in a vehicle, and the power window motor 10 drives a window regulator not illustrated, which moves up and down a window glass. The power window motor 10 is a motor with speed reduction mechanism in which a motor main body 11 and a speed reduction mechanism that decelerates the rotation of the motor main body 11 and transmits the rotation to the window regulator are made into one unit; and the power window motor 10 includes the motor main body 11, which is a drive source, and a gear portion 12, which has the speed reduction mechanism, as illustrated in FIG. 1.

A brushed DC motor is used as the motor main body 11, and a rotation shaft 13 provided at the motor main body 11 is rotatable in a forward direction or a backward direction. A first end side (left side in FIG. 1) of the rotation shaft 13 is rotatably supported, via a bearing not illustrated, by a bottom wall of a motor yoke 14 having a bottomed tubular shape having an opening portion that has an opening at one end, and the motor main body 11 is attached to a gear case 16 of the gear portion 12 by a plurality of bolts 15 at a flange portion 14a provided on the opening side of the motor yoke 14.

Figure 2:
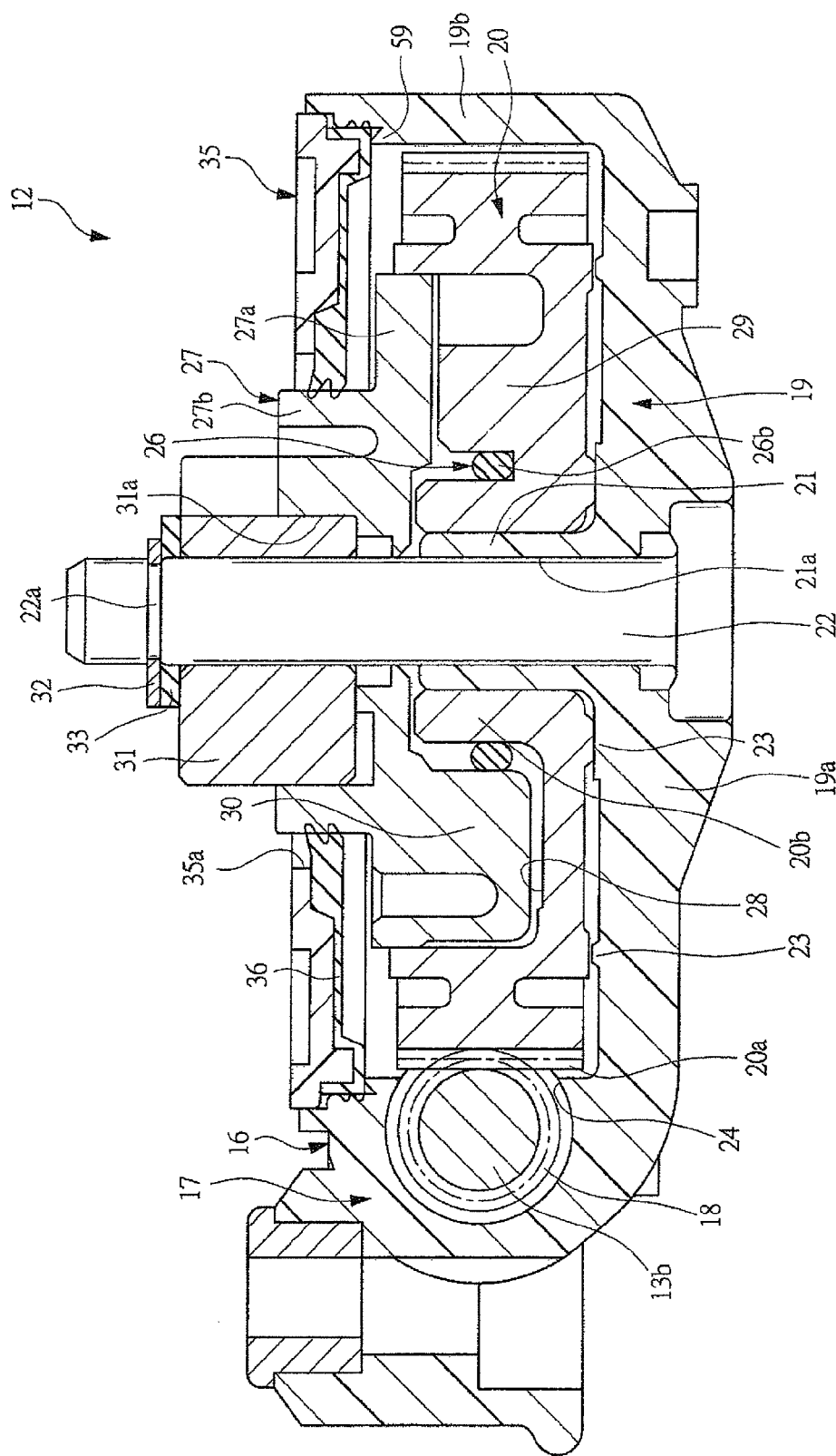
FIG. 2 is a cross-sectional view taken along the line A-A of FIG. 1.

The gear case 16 made of a resin extends in the axial direction of the rotation shaft 13 and is provided with a worm housing portion 17 having an opening on the side of the motor main body 11; the motor main body 11 is fixed to one end face of an opening portion 17a of the worm housing portion 17, and a second end side of the rotation shaft 13 is housed in the worm housing portion 17. A connector unit 62 for supplying power to the motor main body 11 via a commutator 61 provided on the rotation shaft 13 and a brush holder 63 are attached to the opening portion 17a of the worm housing portion 17, and, when drive current is supplied to the motor main body 11 via the commutator 61, the connector unit 62, and the brush holder 63, the rotation shaft 13 is driven to rotate in the forward direction or the backward direction. Also, the rotation shaft 13 has a divided shaft structure composed of an armature shaft 13a rotatably supported by the motor yoke 14 and a worm shaft 13b rotatably supported by the worm housing portion 17. As illustrated in FIG. 2, a worm 18 is integrally provided on the worm shaft 13b, which rotates integrally with the armature shaft 13a.

Figure 3:
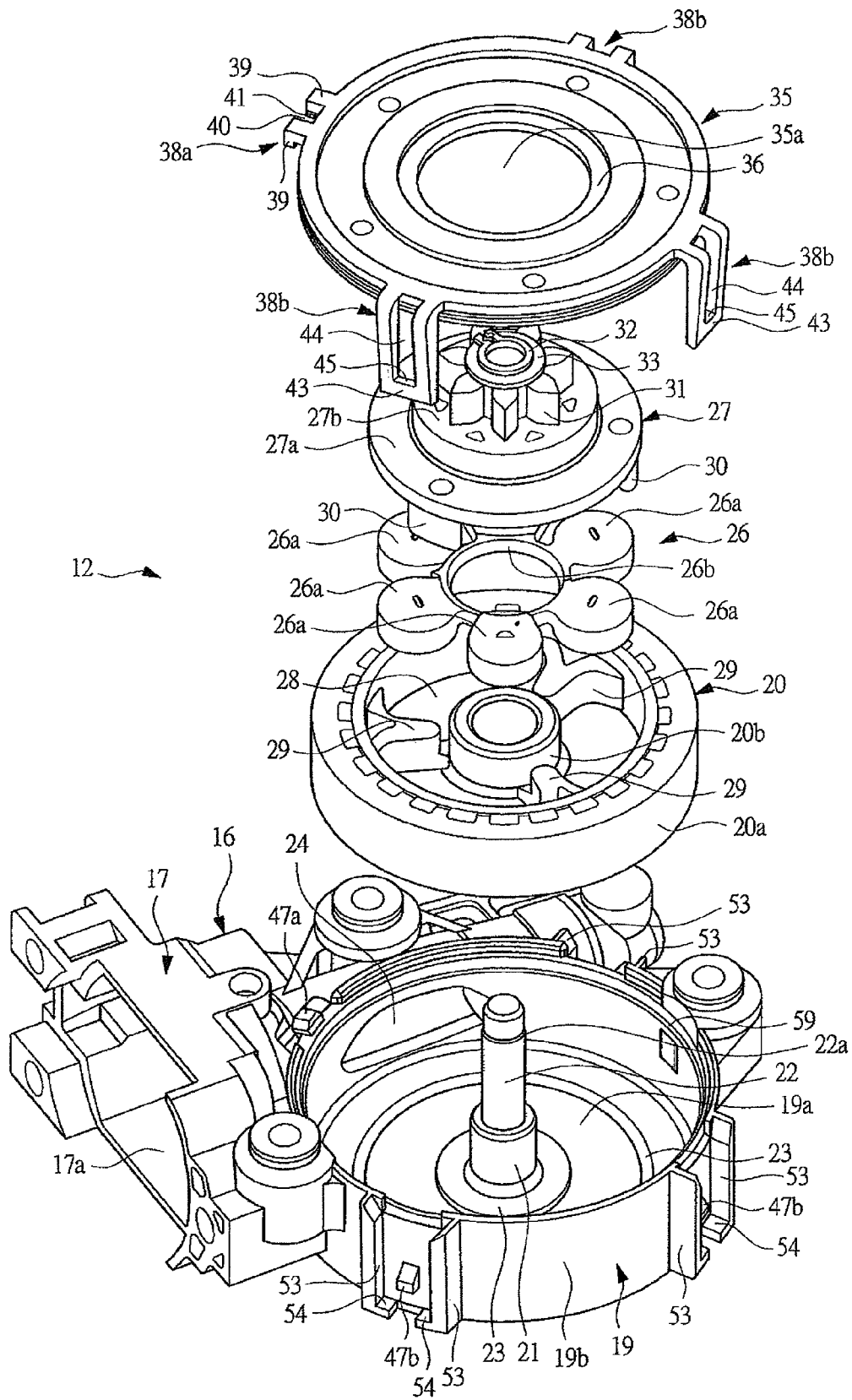
FIG. 3 is an exploded perspective view of a gear portion.

The gear case 16 includes a worm wheel housing portion 19 integrally formed with the worm housing portion 17, and a worm wheel 20 is housed in the worm wheel housing portion 19, the worm wheel 20 having an outer circumferential portion on which a teeth portion 20a meshed with the worm 18 formed on the worm shaft 13b is formed. The worm wheel housing portion 19 has a bottomed cylindrical shape having a bottom wall portion 19a formed to have a circular plate shape and a cylindrical wall portion 19b extending from the outer circumferential portion of the bottom wall portion 19a in the axial direction of an output shaft 22, and an opening is formed in the direction orthogonal to the opening portion 17a of the worm housing portion 17 in the gear case 16. As illustrated in FIGS. 2 and 3, a cylindrical portion 21 extending from the bottom wall portion 19a toward the opening portion side is provided at the shaft center of the worm wheel housing portion 19, and the output shaft 22 having a length longer than a height of the cylindrical wall portion 19b of the worm wheel housing portion 19 from the bottom wall portion 19a is fixed in a through-hole 21a formed in the cylindrical portion 21 in a state in which a tip portion of the output shaft is projecting from the opening portion of the worm wheel housing portion 19.

A boss portion 20b, which is slidably in contact with the outer circumferential surface of the cylindrical portion 21 of the worm wheel housing portion 19, is provided at a center portion in a diametrical direction of the worm wheel 20 housed in the worm wheel housing portion 19, and the worm wheel 20 is rotatably supported by the boss portion 20b about the cylindrical portion 21 as an axis in the worm wheel housing portion 19. An annular projecting portion 23 projecting toward the worm wheel 20 side is provided on the bottom wall portion 19a of the worm wheel housing portion 19, and the annular projecting portion 23 is in slidable contact with an end face of the worm wheel 20 on the bottom wall portion 19a side and slidably supports the worm wheel 20.

The worm wheel housing portion 19 is formed to be adjacent to the worm housing portion 17 so that a tangent line of the cylindrical wall portion 19b of the worm wheel housing portion 19 substantially matches the axial direction of the rotation shaft 13, and, to the cylindrical wall portion 19b of the worm wheel housing portion 19 on the worm housing portion 17 side, a communication hole 24 communicating the worm housing portion 17 with the worm wheel housing portion 19 is formed. The worm 18 housed in the worm housing portion 17 and the teeth portion 20a of the worm wheel 20 housed in the worm wheel housing portion 19 are meshed with each other via the communication hole 24, and the speed reduction mechanism is composed of the worm 18 and the worm wheel 20 meshed with each other inside the gear case 16. The speed reduction mechanism is configured to decelerate the rotation drive of the motor main body 11 to a predetermined speed and output the rotation with increased torque.

The power window motor 10 of the present embodiment uses a damper worm wheel as the worm wheel composing the speed reduction mechanism. A damper member 26 and a follower plate 27 are assembled with the above-described worm wheel 20 so that the rotation of the worm wheel 20 is transmitted to the window regulator via the damper member 26 and the follower plate 27.

An annular recessed portion 28 having an opening that opens toward the opening portion side of the worm wheel housing portion 19 is formed between the outer circumferential portion, on which the teeth portion 20a of the worm wheel 20 is formed, and the boss portion 20b formed at the diametrical-direction center of the worm wheel 20. As illustrated in FIG. 3, the worm wheel 20 includes three projecting portions 29 which project into the recessed portion 28, and the recessed portion 28 is divided at equal interval by the projecting portions 29 provided at the equal interval in the circumferential direction of the worm wheel 20.

A damper member 26 is attached to the recessed portion 28. The damper member 26 has six elastic portions 26a formed at equal interval in the circumferential direction and a coupling portion 26b for integrally and annularly coupling the elastic portions 26a in the inner circumferential side of the damper member 26. The elastic portions 26a are disposed so as to be adjacent to both sides in the circumferential direction of the projecting portions 29 of the worm wheel 20, in other words, two of the elastic portions 26a are housed between each pair of the projecting portions 29. The end faces on both sides in the circumferential direction of each of the elastic portions 26a have an arc shape corresponding to the end faces on both sides in the circumferential direction of the projecting portion 29. When the damper member 26 is attached to the recessed portion 28, housing portions having substantially the same shapes as the projecting portions 29 of the worm wheel 20 are formed between the elastic portions 26a, and the projecting portions 29 of the worm wheel 20 fit in the three housing portions positioned at equal interval in the circumferential direction among the six housing portions, respectively.

Meanwhile, three projecting portions 30 formed to have substantially the same shapes as the projecting portions 29 of the worm wheel 20 are provided at equal interval on the worm wheel 20 side in the circumferential direction of the end face of the follower plate 27, and the projecting portions 30 of the follower plate 27 are fitted in the other three housing portions in which the projecting portions 29 of the worm wheel 20 are not fitted among the six housing portions. More specifically, in the recessed portion 28 of the worm wheel 20, the projecting portions 29 of the worm wheel 20 and the projecting portions 30 of the follower plate 27 are alternately disposed at equal interval, and the elastic portions 26a of the damper member 26 are fitted therebetween. Thus, the rotation of the worm wheel 20 is transmitted from the projecting portions 29 of the worm wheel 20 to the projecting portions 30 of the follower plate 27 via the elastic portions 26a of the damper member 26. The follower plate 27 is relatively rotatable with respect to the worm wheel 20 within a range in which the elastic portions 26a of the damper member 26 are elastically deformed, and, as these elastic portions 26a are relatively rotated to elastically deform the damper member 26, the shock transmitted from the window regulator can be mitigated.

The follower plate 27 has a large-diameter portion 27a covering the opening portion side of the recessed portion 28 of the worm wheel 20 and a small-diameter portion 27b projecting from the inside of the large-diameter portion 27a in the diametrical direction thereof toward the opening portion side of the worm wheel housing portion 19, and the above-described projecting portions 30 are provided on the end face of the large-diameter portion 27a on the worm wheel 20 side so as to project in a direction opposite to the projecting direction of the small-diameter portion 27b. As illustrated in FIG. 2, a gear hole 31a is formed in an end face on a first end side in the axial direction (upper side in the drawing) of the small-diameter portion 27b, and an output gear 31 is fitted in the gear hole 31a.

The output shaft 22 penetrates through the shaft center of the follower plate 27 and the output gear 31, so that the follower plate 27 and the output gear 31 are rotatably supported by the output shaft 22. A groove 22a is formed on the outer circumferential surface of a part of the output shaft 22 that is projecting from the output gear 31, and the follower plate 27 and the output gear 31 are urged toward the worm wheel 20 side by a latched member 32, which is latched and held by the groove 22a, via an O-ring 33 composed of elastic material and supported between the worm wheel 20 and the latched member 32. The rotation transmitted from the rotation shaft 13 (the armature shaft 13a, the worm shaft 13b) of the motor main body 11 to the follower plate 27 via the worm wheel 20 is transmitted to a drive gear of the window regulator by the output gear 31 rotated together with the follower plate 27, thereby moving up/down the window glass.

The small-diameter portion 27b of the follower plate 27 and the output gear 31 are projecting toward the first end side in the axial direction from the opening portion of the worm wheel housing portion 19, and a bottom cover 35 is assembled with the opening portion in the state in which the small-diameter portion 27b and the output gear 31 are projecting therefrom. The bottom cover 35 has a circular plate shape and covers the opening portion of the worm wheel housing portion 19, wherein a projection hole 35a having a larger diameter than that of the small-diameter portion 27b of the follower plate 27 is formed in the inside in the diametrical direction thereof, and the small-diameter portion 27b of the follower plate 27 and the output gear 31 are projecting from the projection hole 35a.

A sealing member 36 formed of an elastic material is attached to a back side (the worm wheel housing portion 19 side) of the bottom cover 35 by outsert molding, the sealing member 36 being in slidable contact with the outer peripheral surface of the small-diameter portion 27b of the follower plate 27 at the inside of the sealing member 36 in the diametrical direction of the sealing member 36, and being pressed against the inner wall surface of the cylindrical wall portion 19b at the outside of the sealing member 36 in the diametrical direction of the sealing member 36, thereby sealing the worm wheel housing portion 19 and preventing rain water, etc. from intruding into the interior of the worm wheel housing portion 19.

Next, the latching structure for assembling the bottom cover 35 with the worm wheel housing portion 19 will be described.

Figure 4:
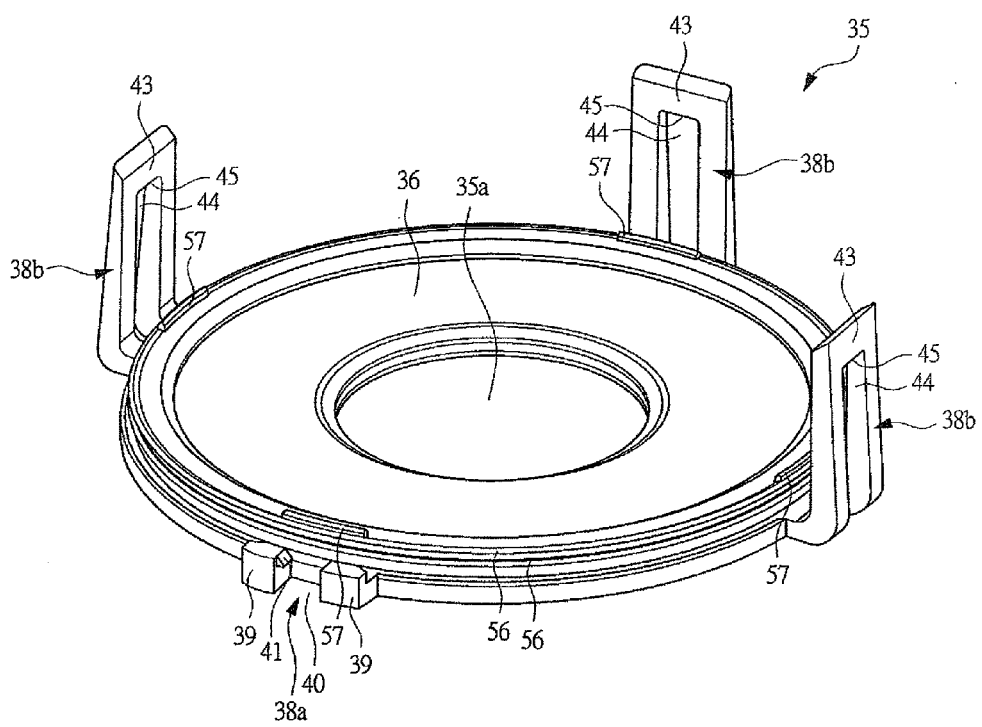
FIG. 4 is a perspective view of a bottom cover viewed from the back side thereof.
Figure 5:
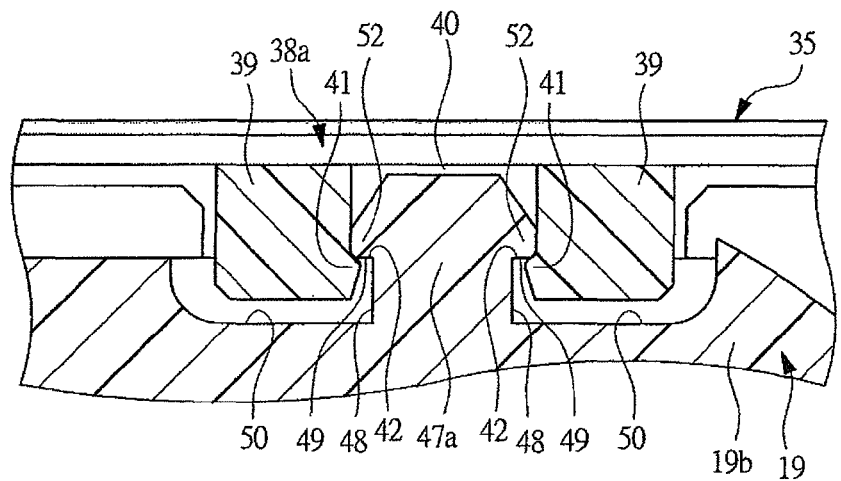
FIG. 5 is a cross-sectional view taken along the line B-B of FIG. 1.
Figure 6:
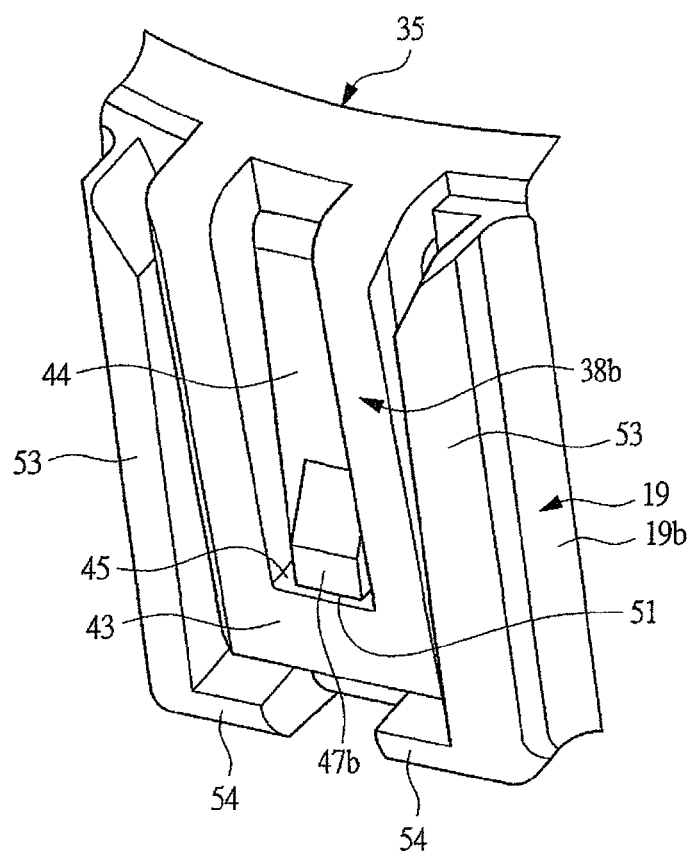
FIG. 6 is an enlarged perspective view of a part indicated by the arrow C of FIG. 1.
Figure 7:
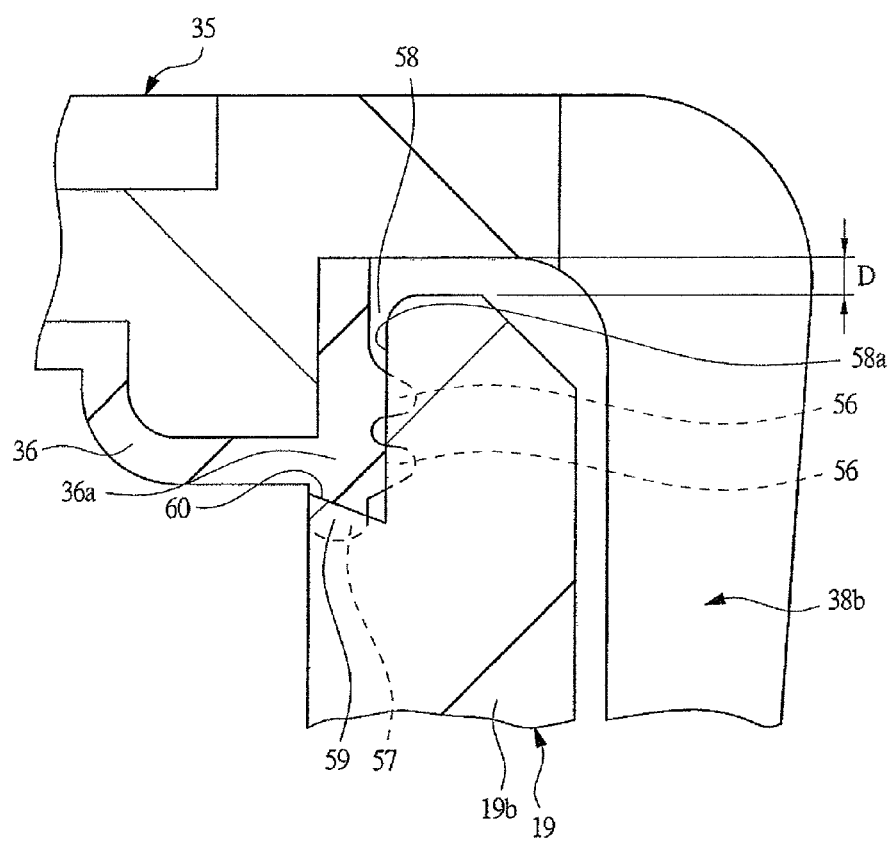
FIG. 7 is a cross-sectional view taken along the line D-D of FIG. 1.

FIG. 4 is a perspective view of the bottom cover viewed from the back side, FIG. 5 is a cross-sectional view taken along the line B-B of FIG. 1, FIG. 6 is an enlarged perspective view of the part indicated by the arrow C of FIG. 1, and FIG. 7 is a cross-sectional view taken along the line D-D of FIG. 1.

As illustrated in FIGS. 3 and 4, the bottom cover 35 has four latching claws 38a and 38b provided at equal interval in the circumferential direction of the bottom cover 35. Among the latching claws 38a and 38b, the latching claw 38a provided on the worm housing portion 17 side, in other words, provided at a position where the outer wall surface of the cylindrical wall portion 19b of the worm wheel housing portion 19 and the worm housing portion 17 are overlapped with each other in the axial direction of the output shaft 22 is provided with a pair of claw portions 39 projecting from the outer circumferential portion of the bottom cover 35 toward the outside in the diametrical direction of the bottom cover 35 and projecting toward the worm wheel housing portion 19 side by a short distance. The claw portions 39 are provided with predetermined interval therebetween in the circumferential direction, and a groove 40 is formed in between the claw portions 39. As illustrated in FIG. 5, at tips of the claw portions 39, engaging portions 41 projecting toward the interior of the groove 40 from side surfaces (inner surfaces) of the claw portions 39 by which the claw portions 39 are facing each other are provided, respectively, and engagement surfaces 42 are formed on end faces of the engaging portions 41 on the bottom cover 35 side.

Among the latching claws 38a and 38b, as illustrated in FIG. 6, the other three latching claws 38b provided on the side excluding the worm housing portion 17 side are projecting from the outer circumferential portion of the bottom cover 35 toward the outside in the diametrical direction and extending to the worm wheel housing portion 19 side along the outer wall surface of the cylindrical wall portion 19b of the worm wheel housing portion 19. A groove 44 is formed in the extending direction of the latching claw 38b in the circumferential-direction center portion of each of the latching claw 38b except for a tip portion 43 thereof, and an engaging surface 45 parallel to the diametrical direction is formed on the axial-direction end face of the tip portion 43 in the bottom cover 35 side.

Meanwhile, as shown in FIGS. 1 and 3, on the worm wheel housing portion 19, projecting pieces 47a and 47b corresponding to and engaged with the latching claws 38a and 38b of the bottom cover 35 are provided at equal interval in the circumferential direction. Among the projecting pieces 47a and 47b, the projecting piece 47a provided on the worm housing portion 17 side is corresponding to the groove 40 of the latching claw 38a and projecting toward the bottom cover 35 side from the end face on the opening portion side of the cylindrical wall portion 19b (worm wheel housing portion 19). As illustrated in FIG. 5, undercut portions 48 cut away toward the inside of the circumferential direction are formed in the base end portions on both sides in the circumferential direction of the projecting piece 47a, and engaging portions 52 having engaging surfaces 49 are formed on the tip portions on both sides in the circumferential direction of the projecting piece 47a to project toward the outside in the circumferential direction than the undercut portions 48. The engaging surfaces 49 refer to the surfaces which are formed in the direction substantially perpendicular to the undercut portions 48 and forming the engaging portions 52. To the end face on the opening portion side of the cylindrical wall portion 19b, cut-away portions 50 cut away toward the second end side of the axial direction (lower side in the drawing) are formed on both sides in the circumferential direction of the position at which the projecting piece 47a is formed. The engaging surfaces 49 are disposed so as to be opposed to the cut-away portions 50 and formed in the plane extending from the end face on the opening portion side of the cylindrical wall portion 19b.

Among the projecting pieces 47a and 47b, as illustrated in FIG. 6, each of the other three projecting pieces 47b provided in the part excluding the worm housing portion 17 side corresponds to the second end side in the axial direction (lower side in the drawing) of the groove 44 of the latching claw 38b and projecting toward the outside in the diametrical direction from the outer wall surface of the cylindrical wall portion 19b. The projecting piece 47a has such a shape that it can be inserted to the groove 44 on the second end side in the axial direction, and an engaging surface 51 extending in the diametrical direction is formed on the end face on the second end side in the axial-direction of the projecting piece 47b.

The latching structure for assembling the bottom cover 35 with the worm wheel housing portion 19 (gear case 16) is composed of the latching claws 38a and 38b (grooves 40, 44) provided on the bottom cover 35 and the projecting pieces 47a and 47b provided on the worm wheel housing portion 19, and the assembly thereof is carried out by the plurality of latching structures latched by the claws; therefore, dissolution and reassembly of the bottom cover 35 and the worm wheel housing portion 19 upon, for example, maintenance is easy.

As illustrated in FIG. 5, the latching claw 38a serving as the latching structure provided to the bottom cover 35 on the worm housing portion 17 side and the projecting piece 47a formed to the gear case 16 are assembled by causing the pair of claw portions 39 of the latching claw 38a to enter the cut-away portions 50 formed to the end face on the opening portion side of the cylindrical wall portion 19b, inserting the projecting piece 47a into the groove 40, and latching and fixing the engaging portions 41 of the claw portions 39 by the engaging portions 52 of the projecting piece 47a. More specifically, the latching claw 38a and the projecting piece 47a are fixed when the engaging surfaces 42 of the engaging portions 41 of the claw portions 39 and the engaging surfaces 49 of the projecting piece 47a are engaged with each other.

Meanwhile, as illustrated in FIG. 6, the latching claws 38b serving as the latching structures provided at the part excluding the worm housing portion 17 side are assembled with the projecting pieces 47b by inserting the projecting pieces 47b into the grooves 44 on the second end side in the axial direction and latching and fixing the tip portions 43 of the latching claws 38b by the projecting pieces 47b. More specifically, the latching claws 38b and the projecting pieces 47b are fixed when the engaging surfaces 45 of the tip portions 43 and the engaging surfaces 51 of the projecting pieces 47b are engaged with each other.

In this manner, as the latching structure of the worm housing portion 17 side, the groove 40 provided with the engaging portions 41 projecting from the side surface is provided on the outer circumferential portion of the bottom cover 35, and the projecting piece 47a inserted in the groove 40 and engaged with the engaging portions 41 is provided on the end portion of the worm wheel housing portion 19 on the opening portion side; therefore, as compared with providing the latching structure composed of the latching claw 38b and the projecting piece 47b, fixation can be carried out with small space, and, even on the worm housing portion 17 side wherein sufficient space may not be ensured on the outer wall surface of the cylindrical wall portion 19b, the latching structure can be provided without increasing the thickness of the gear case 16. Therefore, when the latching structure is provided on the worm housing portion 17 side, the interval between the latching structures can be reduced, sufficient latching force can be provided between the worm wheel housing portion 19 and the bottom cover 35, and the worm wheel housing portion 19 is reliably sealed.

Also, when the latching structures are provided on the worm housing portion 17 side, the latching structures can be provided at equal interval (symmetrical positions) in the circumferential direction of the worm wheel housing portion 19, well-balanced assembly can be carried out, and the bottom cover 35 can be shared by the power window motors 10 of the power window devices provided on both left and right sides in a travelling direction of the vehicle.

Note that, in the present embodiment, the latching structure composed of the latching claw 38a (groove 40) and the projecting piece 47a is used only on the worm housing portion 17 side; however, this latching structure is only required to be used on at least the worm housing portion 17 side, and it goes without saying that it can be used to the latching structures of the other positions. Furthermore, in the present embodiment, the bottom cover 35 is provided with the grooves 40 and 44, and the worm wheel housing portion 19 is provided with the projecting pieces 47a and 47b; however, the bottom cover 35 may be provided with the projecting pieces 47a and 47b, and the end portion of the worm wheel housing portion 19 on the opening portion side may be provided with the grooves 40 and 44.

As illustrated in FIG. 6, the outer wall surface of the cylindrical wall portion 19b of the worm wheel housing portion 19 is provided with wall portions 53 and 54 which cover both side surfaces in the circumferential direction and a tip face on the first end side in the axial direction of the latching claws 38b when the latching claws 38b and the projecting pieces 47b are assembled. The wall portion 53 covering the side surface of the latching claw 38b is formed in the axial direction of the output shaft 22 from the end face of the cylindrical wall portion 19b on the opening portion side to the end face on the bottom wall portion 19a side, and formed to have a height in the diametrical direction which is the projecting direction of the cylindrical wall portion 19b from the outer wall surface being higher than a diametrical-direction height of the latching claw 38b, which is formed on the bottom cover 35, (diametrical-direction height of the latching claw 38b) to the diametrical-direction outside end face, and the wall portion 53 has the shape that it covers the entire side surface of the latching claw 38b.

On the bottom wall portion 19a side of the cylindrical wall portion 19b, the wall portion 54 covering the tip face of the latching claw 38b is formed from the wall portions 53 in the direction to be close to each other, and, as well as the wall portions 53, the wall portion 54 in the diametrical direction is formed to have a height larger than the diametrical-direction height of the latching claw 38b. The center portion in the circumferential direction of the wall portion 54 is cut away, so that the tip portion 43 of the latching claw 38b can be easily held by fingers when the lathing claw 38b is pushed open toward the outside in the diametrical direction upon, for example, maintenance to release the engagement between the groove 44 (latching claw 38b) and the projecting piece 47b.

In this manner, the wall portions 53 and 54 covering the side surfaces and tip faces of the latching claws 38b disposed outside in the diametrical direction of the outer wall surface of the cylindrical wall portion 19b are provided on the outer surface of the cylindrical wall portion 19b, thereby preventing breakage of the latching claws 38b or release of the engagement of the latching claws 38b caused when, for example, an object collides with the latching claws 38b after assembly of the worm wheel housing portion 19 and the bottom cover 35.

Note that, in the present embodiment, the wall portion 54 covering the tip face of the latching claw 38b has the shape in which the center portion in the circumferential direction thereof is cut away so that the tip portion 43 of the latching claw 38b can be easily held by fingers upon release of the engagement of the groove 44 and the projecting piece 47b; however, the entire tip face of the latching claw 38b may be covered by the wall portion 54. Moreover, in the present embodiment, the diametrical-direction height of the wall portions 53 and 54 is formed to be higher than the diametrical-direction height of the latching claws 38b so that the latching claws 38b do not project to the outside in the diametrical direction than the wall portions 53 and 54; however, the diametrical-direction height of the wall portions 53 and 54 may be formed to be equal to the diametrical-direction height of the latching claws 38b.

As illustrated in FIG. 4, the outer circumferential portion 36a of the sealing member 36 attached to the back surface of the bottom cover 35 is provided with two annular diametrical-direction projecting portions 56 projecting toward outside in the diametrical direction and four arc-shaped axial-direction projecting portions 57 projecting toward the worm wheel housing portion 19 side in the axial direction; wherein the axial-direction projecting portions 57 are provided at equal interval in the circumferential direction so as to correspond to the locations at which the latching claws 38a and 38b are provided.

On the other hand, as illustrated in FIG. 7, a cut-away portion 58 partially cut away at the inside thereof in the diametrical direction is formed at the tip portion of the cylindrical wall portion 19b of the worm wheel housing portion 19, and an annular step portion 59 serving as a barb structure is provided on the inner wall surface of the tip portion of the cylindrical wall portion 19b. An inclined surface 60 inclined toward the second-end side in the axial direction (lower side in the drawing) as the distance therefrom toward the outside in the diametrical direction is increased is formed on the end face in the axial direction of the step portion 59.

When the worm wheel housing portion 19 and the bottom cover 35 are assembled, the outer circumferential portion 36a of the sealing member 36 enters the cut-away portion 58 provided at the tip portion of the cylindrical wall portion 19b, the diametrical-direction projecting portions 56 of the sealing member 36 are pressed against a sealing surface 58a which is an end face in the diametrical direction of the cut-away portion 58, and the axial-direction projecting portions 57 of the sealing member 36 are pressed against the inclined surface 60 of the step portion 59. At this point, a predetermined gap D is formed between the bottom cover 35 and the tip face of the cylindrical wall portion 19b. When this gap D is provided, the engaging surfaces 45 of the engaging claws 38b and the engaging surfaces 51 of the projecting pieces 47b can be detached from each other by pushing and shrinking the axial-direction projecting portions 57 so as to relatively move the bottom cover 35 in the axial direction toward the worm wheel housing portion 19, and dissolution and assembly of the worm wheel housing portion 19 and the bottom cover 35 can be easily carried out.

When the diametrical-direction projecting portions 56 are pressed against the sealing surface 58a of the cylindrical wall portion 19b, the worm wheel housing portion 19 is sealed, relative movement of the bottom cover 35 in the diametrical direction with respect to the worm wheel housing portion 19 is suppressed, and the diametrical-direction rattling between the bottom cover 35 and the worm wheel housing portion 19 is suppressed by the diametrical-direction projecting portions 56.

Meanwhile, when the axial-direction projecting portions 57 are pressed against the inclined surface 60 of the step portion 59, axial-direction tense load is applied by the axial-direction projecting portions 57 in the direction that detaches the bottom cover 35 and the worm wheel housing portion 19 from each other, in other words, in the direction that the engaging surfaces 45 of the engaging claws 38*b* and the engaging surfaces 51 of the projecting pieces 47*b* are firmly engaged with each other. As a result, relative movement of the bottom cover 35 in the axial direction with respect to the worm wheel housing portion 19 is suppressed, and an axial-direction rattling between the bottom cover 35 and the worm wheel housing portion 19 is suppressed by the axial-direction projecting portions 57. Moreover, since the axial-direction projecting portions 57 are guided toward the outside in the diametrical direction by the inclined surface 60, the axial-direction projecting portions 57 can be prevented from entering inside in the diametrical direction than the step portion 59, and the sealing member 36 is actively pressed against the sealing surface 58*a* of the cylindrical wall portion 19*b*.

In this manner, the axial-direction projecting portions 57 projecting in the axial direction are provided on the outer circumferential portion of the sealing member 36, and the step portion 59 provided with the inclined surface 60 against which the axial-direction projecting portions 57 are pressed so that the axial-direction projecting portions 57 are guided to the outside in the diametrical direction is provided on the inner wall surface of the worm wheel housing portion 19; therefore, the axial-direction rattling between the bottom cover 35 and the worm wheel housing portion 19 is suppressed, and generation of abnormal noise due to the rattling can be prevented. Moreover, since the axial-direction projecting portions 57 are guided toward the outside in the diametrical direction by the inclined surface 60, the axial-direction projecting portions 57 can be prevented from entering toward the inside in the diametrical direction than the step portion 59, the sealing member 36 is actively pressed against the sealing surface 58*a* of the cylindrical wall portion 19*b*, and the rattling is thus reliably suppressed.

Note that, in the present embodiment, the axial-direction projecting portions 57 in an arc shape are provided at the four locations so as to correspond to the locations at which the latching claws 38*a* and 38*b* are provided, thereby reducing the axial-direction tense load compared with the case in which the axial-direction projecting portions 57 are annularly provided; however, it goes without saying that the axial-direction projecting portions 57 can be provided annularly.

It is needless to say that the present invention is not limited to the foregoing embodiments and various modifications and alterations can be made within the scope of the present invention. For example, the above-described embodiment has described the case in which the motor with speed reduction mechanism of the present invention has been used in the power window motor 10 of the power window device which moves up/down the window glass of the vehicle; however, the present invention is not limited thereto, and can also be used in a drive source of, for example, a wiper device or an electric sunroof device mounted in a vehicle.

In addition, in the above-described embodiment, the brushed DC motor has been used in the motor main body 11 serving as a drive source; however, the motor is not limited thereto. For example, a brushless electric motor or the like can be used as long as it can drive and rotate the rotation shaft 13 in both the forward and backward directions.

Moreover, in the above-described embodiment, the damper worm wheel has been used as the worm wheel of the speed reduction mechanism. However, a damperless worm wheel not provided with the damper member 26 and the follower plate 27 may be used.

While the present invention has been illustrated and described with respect to a particular embodiment thereof, it should be appreciated by those of ordinary skill in the art that various modifications to this invention may be made without departing from the spirit and scope of the present.

What is claimed is:

1. A motor with a speed reduction mechanism including:
a yoke rotatably supporting an armature shaft;
a worm shaft integrally rotated with the armature shaft and provided with a worm;
a gear case provided with a worm housing portion housing the worm shaft and provided with a worm wheel housing portion in a bottomed shape housing a worm wheel meshed with the worm of the worm shaft, the gear case having the yoke attached; and
a bottom cover covering an opening portion of the worm wheel housing portion,
the motor with a speed reduction mechanism comprising:
a latching claw provided on an outer circumferential portion of the bottom cover and extending along an outer wall surface of the worm wheel housing portion;
a projecting piece provided on either one of the latching claw or the outer wall surface of the worm wheel housing portion and projecting toward the other one of the latching claw or the outer wall surface of the worm wheel housing portion;
a groove provided on the other one of the latching claw or the outer wall surface of the worm wheel housing portion and engaged with the projecting piece as the projecting piece is inserted in the groove;
a wall portion provided on the outer wall surface of the worm wheel housing portion and covering a side surface and a tip face of the latching claw;
a follower plate housed in the worm wheel housing portion, the follower plate having a small-diameter portion projecting from a projection hole of the bottom cover and transmitting the rotation of the worm wheel; and
a sealing member attached to a back side of the bottom cover, a diametrical direction inside portion of the sealing member being in slidable contact with an outer peripheral surface of the small-diameter portion of the follower plate, and a diametrical-direction outside portion of the sealing member being in contact with a cylindrical wall portion of the worm wheel housing portion.

2. A motor with a speed reduction mechanism including:
a yoke rotatably supporting a rotation shaft provided with a worm;
a gear case provided with a worm housing portion housing the worm and provided with a worm wheel housing portion in a bottomed shape housing the worm wheel meshed with the worm, the gear case having the yoke attached; and
a bottom cover covering an opening portion of the worm wheel housing portion,
the motor with a speed reduction mechanism comprising:
a latching claw provided on an outer circumferential portion of the bottom cover and extending along an outer wall surface of the worm wheel housing portion;
a projecting piece provided on either one of the latching claw or the outer wall surface of the worm wheel housing portion and projecting toward the other one of the latching claw or the outer wall surface of the worm wheel housing portion;
a groove provided on the other one of the latching claw or the outer wall surface of the worm wheel housing portion and engaged with the projecting piece as the projecting piece is inserted in the groove;

a wall portion provided on the outer wall surface of the worm wheel housing portion and covering a side surface and a tip face of the latching claw;

a follower plate housed in the worm wheel housing portion, the follower plate having a small-diameter portion projecting from a projection hole of the bottom cover and transmitting the rotation of the worm wheel; and a sealing member attached to a back side of the bottom cover, a diametrical-direction inside portion of the sealing member being in slidable contact with an outer peripheral surface of the small-diameter portion of the follower plate, and a diametrical-direction outside portion of the sealing member being in contact with a cylindrical wall portion of the worm wheel housing portion.

3. The motor with a speed reduction mechanism according to claim 1, wherein the wall portion covers an entire side surface of the latching claw.

4. The motor with a speed reduction mechanism according to claim 2, wherein the wall portion covers an entire side surface of the latching claw.

5. The motor with a speed reduction mechanism according to claim 1, wherein the projecting piece and the groove are engaged with each other by an engaging surface formed in a diametrical direction of the worm wheel housing portion.

6. The motor with a speed reduction mechanism according to claim 2, wherein the projecting piece and the groove are engaged with each other by an engaging surface formed in a diametrical direction of the worm wheel housing portion.

7. The motor with a speed reduction mechanism according to claim 1, wherein the wall portion is formed to project to an outside diameter side than the latching claw with respect to a diametrical direction of the worm wheel housing portion.

8. The motor with a speed reduction mechanism according to claim 2, wherein the wall portion is formed to project to an outside diameter side than the latching claw with respect to a diametrical direction of the worm wheel housing portion.

9. The motor with a speed reduction mechanism according to claim 1, wherein a tip portion of the cylindrical wall portion of the worm wheel housing portion has a cut-away portion partially cut away at the inside thereof in the diametrical direction thereof, an annular step portion serving as a barb structure is provided on the inner wall surface of the tip portion of the cylindrical wall portion, an inclined surface is inclined in the axial direction of the worm wheel housing portion while extending toward the outside in the diametrical direction of the worm wheel housing portion is formed on an end face in the axial direction of the step portion, when the worm wheel housing portion and the bottom cover are assembled, the diametrical-direction outside portion of the sealing member is pressed against a diametrical-direction end face of the cut-away portion provided at the tip portion of the cylindrical wall portion, and a gap is formed between the bottom cover and the tip face of the cylindrical wall portion.

10. The motor with a speed reduction mechanism according to claim 2, wherein a tip portion of the cylindrical wall portion of the worm wheel housing portion has a cut-away portion partially cut away at the inside thereof in the diametrical direction thereof, an annular step portion serving as a barb structure is provided on the inner wall surface of the tip portion of the cylindrical wall portion, an inclined surface is inclined in the axial direction of the worm wheel housing portion while extending toward the outside in the diametrical direction of the worm wheel housing portion is formed on an end face in the axial direction of the step portion, when the worm wheel housing portion and the bottom cover are assembled, the sealing member is pressed against the cut-away portion of the tip portion of the cylindrical wall portion at the outside of the sealing member in the diametrical direction of the sealing member, and a gap is formed between the bottom cover and the tip face of the cylindrical wall portion.

* * * * *